United States Patent

Hill

[15] 3,638,728
[45] Feb. 1, 1972

[54] SECONDARY OIL RECOVERY PROCESS WITH INCREMENTAL INJECTION OF SURFACTANT SLUGS

[72] Inventor: Harold J. Hill, Houston, Tex.
[73] Assignee: Shell Oil Company, New York, N.Y.
[22] Filed: Mar. 11, 1970
[21] Appl. No.: 18,734

[52] U.S. Cl. ............................................................166/273
[51] Int. Cl. ..........................................................E21b 43/22
[58] Field of Search .........................................166/273, 274

[56] References Cited

UNITED STATES PATENTS

| | | | |
|---|---|---|---|
| 3,288,213 | 11/1966 | King et al. | 166/274 |
| 3,346,047 | 10/1967 | Townsend et al. | 166/273 |
| 3,437,140 | 4/1969 | Foster et al. | 166/273 |
| 3,491,834 | 1/1970 | Ahearn et al. | 166/273 |
| 3,508,612 | 4/1970 | Reisberg et al. | 166/274 |

*Primary Examiner*—Ian A. Calvert
*Attorney*—George G. Pritzker and J. H. McCarthy

[57] ABSTRACT

An improved method for recovering oil from underground formations by prior to waterflooding, treating said formations with at least two chemical slugs each containing a synergistic mixture of particular surfactants namely sulfonate-sulfate mixture wherein one slug is compatible with water of high salinity and hardness and the other slug is compatible with the floodwater which optionally can contain a thickener.

6 Claims, No Drawings

3,638,728

SECONDARY OIL RECOVERY PROCESS WITH INCREMENTAL INJECTION OF SURFACTANT SLUGS

BACKGROUND OF THE INVENTION

This invention relates to the displacement of oil from the pores of subterranean, oil-containing reservoirs, and more particularly to special surface-active systems to be used with "waterflooding"d techniques to improve the oil displacement efficiency of waterfloods.

Knowledge is widespread in the oil industry that the so-called "primary recovery" techniques, which include natural flow, gas-lifting, gas repressurization and pumping methods, leave substantial quantities of oil in oil-bearing reservoirs. In addition, there are oil-bearing reservoirs which even though containing large quantities of oil, are incapable of being produced by primary recovery techniques. Recognition of the large amount of residual oil in many oil-producing reservoirs has led to the use of the so-called "secondary recovery" techniques which have as their primary purpose the economical recovery of additional quantities of the residual oil known to be present in the reservoir.

Probably one of the more common secondary recovering techniques is the so-called "waterflooding" in which aqueous fluids are injected at one point in the reservoir at pressures sufficient to be forced out into the reservoir and toward a spaced production well or wells, thus, in effect, displacing oil from the pores of the reservoir and driving the oil ahead of the water front.

However, waterflooding is only advantageous when the cost of injecting water and necessary chemical modifiers is less than the value of the oil recovered. Therefore, the displacement efficiency of waterfloods has been the determining factor or whether such a technique will be used.

Generally, the difficulty with waterfloods is that the small pores and capillaries of the reservoir contain hydrocarbons (oil and/or oil and gas) which are generally water immiscible. The existence of high interfacial tensions between the boundary of the water and hydrocarbons seriously impedes the ability of the water to displace oil trapped in the reservoir by capillarity.

Since in many oil reservoirs the oil tends to be trapped within pores of the interconnected capillary system of the rock formations by capillarity, merely forcing water therethrough will not displace much of this trapped oil. However, a reduction in the interfacial tension between the water and the oil will tend to increase the amount of oil that will be displaced by the water. Thus, various aqueous surfactant systems have been proposed for use in waterflooding processes for recovering the oil. In many such prior systems the interfacial tension between the oil and water is reduced from a characteristic value in the order of 50 dynes per centimeter to a value of from about 1 to 10 dynes per centimeter. If the interfacial tension is reduced to only about 1 to 10 dynes per centimeter, the increase in the amount of oil that can be recovered is not generally significant. Thus, the cost of obtaining the reduction in the interfacial tension is apt to be more than the value of the increased amount of oil that is recovered in many cases.

Many liquid systems containing surfactants have been used to aid in oil recovery and among the most promising of such systems are those described in U.S. Pat. Nos. 3,275,075; 3,324,944; 3,330,344; 3,348,611; 3,366,174; 3,469,630; 3,477,508; 3,477,511; 3,478,823; 3,480,080 and Netherlands Pat. No. 6,812,398, in which improved and effective oil recovery is achieved by a waterflood in which a frontal portion is a liquid containing surfactants such as surfactant micelles that are combined with molecules of an amphiphilic organic compound of low water solubility. Generally, in these systems, the concentration of the surfactant in the aqueous solution exceeds the critical concentration for micelle formation and the amphiphilic material swells or becomes associated with the surfactant micelles and causes the aqueous solution to exhibit little or no interfacial tension against the oil.

Although the surfactant systems described in the above-cited patents are generally effective, their beneficial effects tend to be reduced when polyvalent metal ions are present in the earth formation. Such ions tend to cause either the precipitation of the surfactant or the generation of viscous emulsions and the plugging of the pores of the earth formation. In addition, the surfactant materials used in such prior systems tend to be absorbed to an extent that is disadvantageous on the surfaces of oil-containing earth formations.

Although the pretreatment chemical process as described in the U.S. Pat. application, Ser. No. 752,882, filed Aug. 15, 1968 and now U.S. Pat. No. 3,508,612, is superior to the prior art as illustrated by the references cited above thereby resulting in improved secondary oil recovery, problems arise where formation water or injected water is of high salinity and hardness causing plugging and emulsion formation, said plugging and emulsion formation adversely affects relative mobilities, resulting in a decreased sweep efficiency of the recovery system thereby resulting in inefficient oil recovery.

SUMMARY OF THE INVENTION

It has now been found that the above deficiencies of chemical slug treatment as described in the above-cited art can be successfully obviated and an increased tolerance of chemical slugs for high salinity and hardness of formation and/or injected saline water and improved mobility and sweep efficiency can be obtained by incremental or staged injection of the chemical slugs so that one of said slugs has a high compatibility for hard and/or saline formation water and the other slug has a high compatibility for the floodwater which may be fresh water which may contain a thickener, pusher or other viscosity-increasing agent, resulting in improved mobility, permeability control and oil recovery.

The staged or incremental injection of at least two chemical slugs of the present invention, each of which generally comprise aqueous solutions containing different mixtures of dissimilar surfactants, of which preferably at least one is an alkali metal or ammonium or amine salt of an organic sulfonate, and the other one is an alkali metal or ammonium or amine salt of a sulfated oxyalkylated organic material. The first slug should preferably contain relatively high concentrations of the additive polyoxyalkylated organic sulfate so as to be compatible with saline and formation water and the second slug containing essentially the same chemical additive mixture but in low concentrations so as to be compatible with fresh water or the drive water which may contain a thickener or viscosity-increasing agent. Staged or incremental injection of these properly designed chemical slugs achieves improvement in mobility and sweep efficiency at minimum concentration of thickeners in the drive water or other places in the recovery process fluids. The use of builders or sacrificial additives such as tripolyphosphate, organic phosphates, sodium carbonates which minimize adsorption of surfactants onto the formation surfaces, is also minimized or eliminated.

In essence, the present invention improves the compatibility of a mixed sulfonate-sulfate surfactant system relative to a situation in which the salinity of the water in the reservoir is different from that of the drive water. The improvement is effected by dividing the system into at least two portions and adjusting the ratio of sulfonate-to-sulfate by weight of each portion to enhance its individual compatibility with the water that is contacted by it. Where the salinity of the water is relatively high, the ratio of sulfonate to sulfate is low, and vice versa.

The present invention is an improvement over the system described in copending application Ser. No. 752,882, filed Aug. 15, 1968, (U.S. Pat. No. 3,508,612) since such a single-injection system has been found to have a tendency to be either incompatible or inactive (relative to oil-displacement efficiency) where, for example, the formation water is highly saline and the drive water is relatively fresh. Thus, in a single-injection system it has been found that if the sulfonate-to-sulfate ratio is low enough to ensure compatibility with a highly saline formation water, the system tends to lose activity as it becomes diluted by a relatively fresh drive water. In the present two-component system, the overall behavior of a composite system that has a front portion in which the ratio is relatively low and a rear portion in which the ratio is relatively high provides substantially all of the advantageous properties, such as adequate activity and low adsorption, that are characteristic of the systems of the type described in the copending application, but avoids the disadvantage of either poor compatibility with the saline water ahead or a loss of activity due to dilution by the fresh water behind.

DESCRIPTION OF THE PREFERRED EMBODIMENT

The organic sulfonate useful as one of the additives in the solution slugs can be substantially any surfactant salt of an organic sulfonate provided it possesses surfactant-amphiphile properties generated by the oil solubility versus water solubility spectrum of the sulfonate. In such surfactant sulfonates the oil-soluble (generally higher molecular weight) constituents serve as amphiphiles and are solubilized in the aqueous system by the primarily water-soluble (generally lower molecular weight) sulfonates. Anionic sulfonate surfactants of this type can be illustrated by metal or ammonium salts of sulfonate surfactants, e.g., alkali metal, ammonium or polyvalent metal salts of sulfonated petroleum hydrocarbons such as alkylated naphthalene sulfonates, alkylated benzene sulfonates; or the sulfocarboxylate salts, and the like. Preferred sulfonates are the alkali metal (Na, K, Li) salts of petroleum sulfonates such as $C_{15-30}$ alkyl aryl sulfonates, alkylated benzene sulfonates and the like. Materials of this type are sold commercially under various trade names such as petroleum sulfonates sold by Bray Chemical Company or the Bryton Chemical Company as Bryton sulfonate, F, 430, 467, 500, or the Sonneborn Chemical Company as Petronates, or the Socony Mobile Company as "Promor" sulfonates of the SS-6, SS-20 series, American Cyanamid's "Aerosol OT" which is Na dioctyl sulfosuccinate and the like. A preferred sulfonate mixture is a sodium salt of a petroleum sulfonate in the molecular weight range of 350–420 and a sodium salt of a petroleum sulfonate in the molecular weight range of 420–580 or a sodium salt of a mixture of petroleum sulfonates having an average molecular weight in the order of about 430–470.

The sulfated polyoxyalkylated organic material surfactant can be prepared by suitable means such as sulfating with chlorosulfonic acid, sulfur trioxide, sulfonic acid, oleum or sulfuric acid in a suitable solvent, a surface-active water-soluble oxyalkylated organic material having from about 8 to about 20 carbon atoms and represented by the general formula (I) represented by

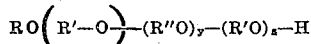

where R is an alkyl radical or organic moiety of 8 to 20 and preferably 10–15 carbon atoms, R' and R" are dissimilar alkyl radicals or groups from 1–6 carbon atoms and preferably are —$C_2H_4$— and —$C_3H_6$— radicals, respectively, x and z are positive integers of at least 1 and y can be zero or a positive integer as x or z. Preferred materials comprise oxylated alcoholic compounds such as oxylalkylated alkanols which can be represented by the general formula (II) represented by

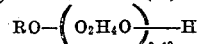

where R is an alkyl radical of 10–15 carbon atoms, the alcohol used in the ethoxylation being a mixture of alcohols of 10–15 carbon atoms. The ethoxylation of the alcohols can be accomplished by means well known in the art. The ethoxylation of primary alcohols to form products represented by formula (II) can be achieved using a strong base of Lewis acid catalysts such as NaOH, $BF_3$ or $SnCl_2$. Oxyalkylated primary alcohols represented by formulas (I) and (II) can be prepared by the method described in U.S. Pat. Nos. 3,036,130 or 3,101,574 or as described in copending U.S. Pat. application to Tsatsos et al. Ser. No. 661,546, filed Aug. 18, 1967.

The sulfation of such a surface-active polyethoxylated material can be accomplished by reacting neat or in the presence of a solvent using as the sulfating agent any of the materials mentioned previously and preferably sulfur trioxide, chlorosulfonic acid, or sulfuric acid. Thus, any of the ethoxylated alcohols can be sulfated by dissolving the alcohol in a solvent such as ethyl ether and adding dropwise chlorosulfonic acid keeping the temperature at 0°–10° C. The HCl formed is removed by bubbling $N_2$ through the solution and the solution neutralized by adding gradually an aqueous methanol solution containing theoretical amounts of base. The solvent is then removed if desired.

Sulfates of ethoxylated primary alcohols are commercially available from Shell Chemical Company under the trade name Neodol 23-3A having the formula $C_{12-13}O(CH_2CH_2O)_3SO_3NH_4$ and Neodol 25-3S $C_{12-15}O(CH_2CH_2O)_3SO_3Na$.

Other anionic sulfated ethoxylated alcohols are available from Union Carbide under the trade name Tergitol S such as Tergitol Anionic 14-S-3A (ammonium salt) or 15-2-3.0 (sodium salt) having the formula:

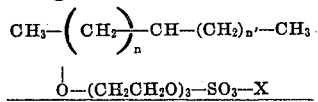

where X is $NH_4$ or Na.

Salts of sulfated polyethoxylated alkyl phenols also can be used in combination with organic sulfonates.

The effectiveness of waterflooding an oil-containing underground formation with staged or incremental slugs of aqueous slugs containing the additive mixture of the present invention, each slug containing different concentrations of the additive mixture; namely, sulfonate surfactant mixed with sulfated polyethoxylated organic surfactant, e.g., Na petroleum sulfonate (av. MW = 430 or 470) and Na sulfate $C_{12-15}$ alcohol (3–9 EO) to aid in oil recovery is illustrated by the data presented in tables I and II. The waterflooding fluid can be water or thickened water in which the thickening agent is a water-soluble salt of a hydrolyzed polyacrylamide of high molecular weight (1–10 million) and available commercially from Dow Chemical Company under the trade name "Pusher 520," "Pusher 700" or "ET-601" or Separan NP10, NP20, AP30, AP273, P62 or Mydel 550 as described in U.S. Pat. Nos. 3,002,960; 3,022,279; 3,039,529; 3,074,481; 3,369,977 and 3,370,649.

TABLE I

| | Chemical Recovery Systems | |
|---|---|---|
| | One-Step Process | Staged or Incremental Process |
| | Parent System** | Sulfonate—DEODOL 25–3S System |
| | | Slug A | Slug B |
| Component: | | | |
| Na petroleum sulfonate (NaSO$_3$R)meq./g. | 0.03 | 0.034 | 0.034 |
| Na tripoly phosphate (Na$_5$P$_3$O$_{10}$)wt. % | 0.5 | — | — |
| Na chloride (NaCl wt. % | 0.9 | — | — |
| Polyacrylamide (Pusher 520) wt. % | 0.04 | — | — |
| Polyacrylamide (Pusher 700) wt. % | — | 0.01 | 0.02 |
| Na sulfate C$_{12-15}$ alcohol containing three ethoxy groups (NEODOL 25–3S) wt. % | — | 0.6 | 0.2 |
| BPW$^a$ wt% | — | 8.0 | 10.0 |
| LMW$^b$ wt. % | ~96.5 | ~89.2 | ~87.8 |
| Compatability$^c$ with: | | | |
| BPW wt. % | 18–25 | 50 | 25 |
| LMW wt. % | 10–15 | 25 | 50 |
| Viscosity (95° F.) cp. at 46 sec.$^1$ | 1.7 | 1.5 | 2.6 |
| Screen Factor | 8.9 | 7.7 | 10.3 |

ᵃBenton, Ill. field produced water; total dissolved solids ~7.5 percent.

ᵇLake Moses water, Ill.; total dissolved solids ~0.02 percent.

ᶜCompatibility—when system is blended with stated amounts or less of BPW or LMW, no precipitation of components occurs and the resulting blend is still capable of displacing residual oil; efficiency is reduced because of dilution. Adsorption is increased in BPW blends.

**Parent System: Ser. No. 758,882, filed Aug. 15, 1968 (U.S. Pat. No. 3,508,612), one-step chemical injection.

Table I indicates that the stage or increment chemical slug injection system significantly increased compatibility for high salinity, high calcium content formation water. It is completely compatible with 25 percent produced water. In addition, it is still capable of oil recovery in 50—50 mixtures with formation water. At these concentrations of formation water the parent system would precipitate sulfonate, or, in the presence of oil, transfer sulfonate to the oil and form viscous emulsions.

Adsorption of surfactant from the stage system may be 25–50 percent higher than adsorption from the parent system (deletion of sacrificial agent). Total surfactant concentration is 41 percent higher in stage A and 23 percent higher in stage B; providing an average of 32 percent more surfactant in each barrel of slug which compensates for the possible increase in adsorption.

Oil recovery capability of the present staged or increment process has been compared with that of the one-step parent process in Berea cores up to 8 feet in length (tests L-4, L-5, table II) and total oil recovered by the present process is better than the process of the patent invention. The increased compatibility of the staged surfactant slugs makes possible elimination of the preflood which was required for the parent process.

TABLE II

| | One-Step Process Parent System | | Staged or Increment Process Sulfonate—NEODOL 25-3S System |
|---|---|---|---|
| | L-4 | L-5 | 732 |
| Core data | | | |
| Length (cm.) | 486 | 244 | 74.8 |
| Permeability (md.) | 742 | 717 | 769 |
| Porosity (% V₀) | 22.5 | 22.2 | 22.2 |
| Process data | | | |
| Preflood; fresh water | 0.05 | 0.00 | 0.00 |
| Surfactant slug, total (V$_p$) | 0.25 | 0.25 | 0.30 |
| Polymer slug (V$_p$) | 1.0 | 0.75 | 0.75 |
| Fresh water (V$_p$) | 1.2 | 0.48 | 0.75 |
| Performance data | | | |
| S$_{or}$ at waterflood | 0.38 | 0.35 | 0.38 |
| S$_o$ at 0.5 V$_p$ process fluids | 0.27 | 0.27 | 0.31 |
| S$_o$ at 1.0 V$_p$ process fluids | 0.13 | 0.11 | 0.11 |
| S$_o$ at 1.25 V$_p$ process fluids | 0.08 | 0.05 | 0.07 |
| S$_o$ at 1.5 V$_p$ process fluids | 0.08 | 0.04 | 0.04 |
| S S$_{ore}$ (extraction) | 0.06 | 0.02 | 0.00 |
| Oil breakthrough (V$_p$) | 0.22 | 0.27 | 0.25 |
| Surfactant breakthrough | 0.90 | 0.97 | 1.08 |
| Oil cut* | 0.29 | 0.30 | 0.31 |

*Fraction of produced fluids; averaged from oil breakthrough to 1.25 V$_p$ injection process fluids.

To summarize the staged or incremental injection of the chemical system produces better total oil recovery with less total injection (no preflood) because of improved compatibility with both produced water and polymer drive which provides insurance against excessive mixing and process breakdown.

In general, the mixture of dissimilar surfactants, at least one of which is a salt of an organic sulfonate and at least one of which is a salt of a sulfated ethoxylated material, can be used in the form of an aqueous solution that contains from about 0.1 to 10 percent by weight each of surfactant material. The preferred range of such concentrations is from about 0.1–5 percent by weight of each surfactant. Such aqueous solutions of the surfactants may contain, or be preceded by, or be followed by water-thickening materials dissolved in aqueous liquids. The water-thickening materials may comprise natural or synthetic polymeric materials such as water-soluble gums and/or polymers such as partially hydrolyzed polyacrylamides such as Dow Chemical Pushers 520 and 700.

The first injected surfactant slug should contain the organic sulfonate and the sulfated ethoxylated surfactant in a concentration ratio such that (1) the resulting slug is interfacially active (lowers interfacial tension adequately) in the presence of oil in the formation to be flooded and (2) the slug is compatible with the water in the formation to be flooded. While the organic sulfonate concentration in the second slug may be either equal to, greater than, or less than the concentration in the first injected slug, the ratio of concentrations of organic sulfonate to ethoxylated sulfate surfactant in the second slug should be such that the resulting slug remains interfacially active while the slug is being diluted with the drive liquid.

It is understood that various changed in the details described to explain the invention can be made by persons skilled in the art within the scope of the invention as expressed in the appended claims.

I claim as my invention:

1. A method of producing oil from oil-containing reservoir formation containing formation or saline-hard water comprising the steps of:
    a. injecting into said formation a slug of aqueous solution containing a mixture of dissimilar surfactants at least one of which is a salt of an organic sulfonate and at least one of which is a salt of a sulfated oxyalkylated alcohol surfactant, the cationic portion of each of said anionic salts being selected from the group consisting of alkali metal, ammonium and amine, in a ratio by weight of the sulfonate to the oxyalkylated surfactant, which is compatible with the salinity of the formation water;
    b. injecting into said formation a slug of aqueous solution containing a mixture of dissimilar anionic surfactants at least one of which is a salt of an organic sulfonate and at least one of which is a salt of sulfated oxyalkylated alcohol, the cationic portion of each of said salts being selected from the group consisting of alkali metal, ammonium and amine, in a ratio by weight of the sulfonate to the oxyalkylated surfactant which is compatible with the water drive of (c) and wherein the ratio of the corresponding additives in slurry (b) is higher than in slurry (a); and
    c. waterflooding the formation with water having a salinity less than that of the formation water which has been treated with slugs (a) and (b) to effect oil recovery.

2. The method of claim 1 wherein the sulfonate is a petroleum sulfonate and the oxyalkylated surfactant is a polyethoxylated alcohol sulfate.

3. The method of claim 2 where in the petroleum sulfonate is na oil-soluble Na petroleum sulfonate and the oxyalkylated surfactant is a sulfated polyethoxylated primary alcohol.

4. The method of claim 3 wherein the sulfated alcohol has from three to six ethoxy groups in the molecule.

5. The method of claim 4 wherein he drive water is water containing a thickener.

6. The method of claim 5 wherein the thickener is a polyacrylamide.

* * * * *